Figure 1:
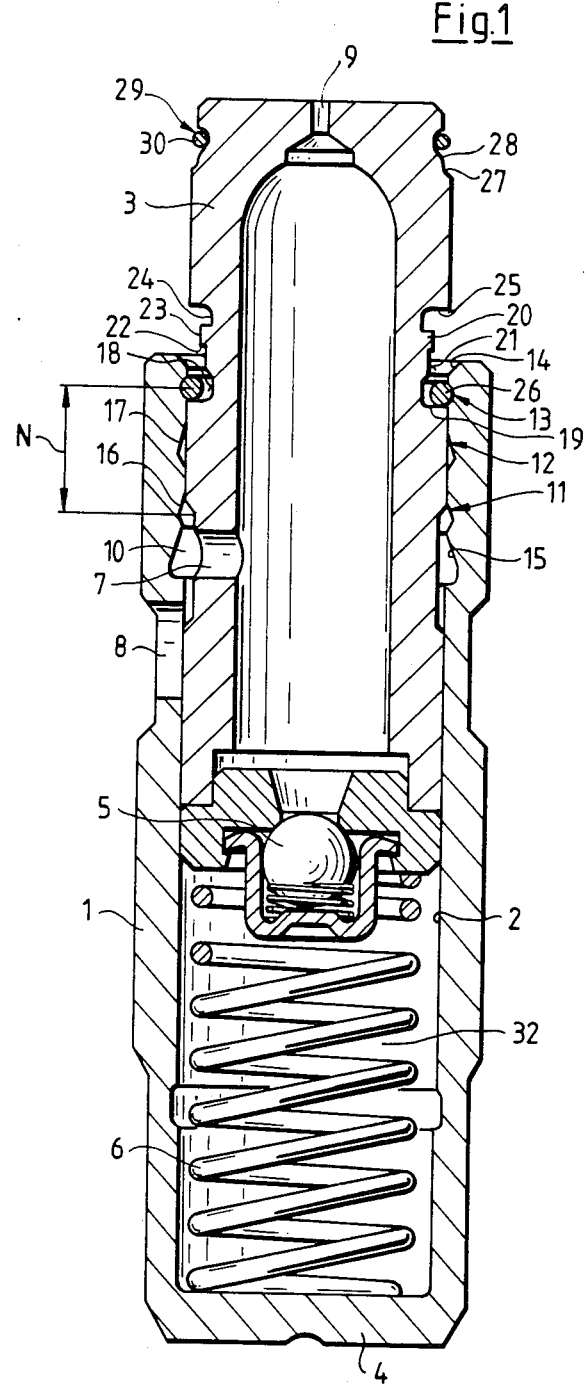

United States Patent [19]

Goppelt et al.

[11] Patent Number: 4,772,251
[45] Date of Patent: Sep. 20, 1988

[54] NOVEL CHAIN TIGHTENER ASSEMBLY

[75] Inventors: Dieter Goppelt, Aurachtal; Dieter Schmidt, Nürnberg, both of Fed. Rep. of Germany

[73] Assignee: INA Walzlager Schaeffler KG, Fed. Rep. of Germany

[21] Appl. No.: 109,286

[22] Filed: Oct. 15, 1987

[30] Foreign Application Priority Data

Oct. 30, 1986 [DE] Fed. Rep. of Germany ....... 3636918

[51] Int. Cl.⁴ ............................................. F16H 7/08
[52] U.S. Cl. .................................... 474/101; 474/111; 474/138
[58] Field of Search ............... 474/101, 109, 110, 111, 474/136, 138; 180/231, 217; 280/267; 267/217; 188/321.11, 322.19

[56] References Cited

U.S. PATENT DOCUMENTS 3,626,776 12/1971 Staudinger et al. ................. 474/111
4,539,001 9/1985 Okabe ..................................... 474/138

Primary Examiner—Thuy M. Bui
Attorney, Agent, or Firm—Bierman and Muserlian

[57] ABSTRACT

In a chain tightener with a dampening piston guided in a housing and axially acted upon by a spring in the chain tightening direction wherein the dampening piston is retainable by a mounting ring within the housing in a blocking position which is released through axial pressure in the direction opposite to the chain tightening direction, the inprovement comprising the mounting ring (30) snaps into a groove (29) which is located at the forward end of the dampening piston (3) and is provided with a bevelled surface (28) and an adjacent latch surface (27), and that the mounting ring (30) is shiftable onto the latch surface (27) via the bevelled surface (28) with a tool insertable in a gap (31) between the housing (1) and the dampening piston (3) wherein the mounting ring (30) engages in a notch (13) of the housing (1) thereby blocking a movement of the dampening piston (3) relative to the housing (1).

5 Claims, 2 Drawing Sheets

NOVEL CHAIN TIGHTENER ASSEMBLY

STATE OF THE ART

Chain tighteners with a dampening piston guided in a housing and axially acted upon by a spring in the chain tightening direction wherein the dampening piston is retained by a mounting ring within the housing in a blocking position which is releasable through axial pressure in opposite direction to the chain tightening direction are described in U.S. Pat. No. 3,626,776. Once the blocking position is released in this chain tightener, then it is almost impossible to bring the dampening piston back into the blocking position since the mounting ring provided for the blocking is installed deeply within the interior of the dampening piston.

OBJECTS OF THE INVENTION

It is an object of the invention to provide a chain tightenen in which the dampening piston is brought into the blocking position from outside with a tool and is easily disengageable without any tool.

This and other objects and advantages of the invention will become obvious from the following detailed description.

THE INVENTION

The novel chain tightener of the invention with a dampening piston guided in a housing and axially acted upon by a spring in the chain tightening direction wherein the dampening piston is retainable by a mounting ring within the housing in a blocking position which is released through axial pressure in the direction opposite to the chain tightening direction is characterized in that the mounting ring (30) snaps into a groove (29) which is located at the forward end of the dampening piston (3) and is provided with a bevelled surface (28) and an adjacent latch surface (27), and that the mounting ring (30) is shiftable onto the latch surface (27) via the bevelled surface (28) with a tool insertable in a gap (31) between the housing (1) and the dampening piston (3) wherein the mounting ring (30) engages in a notch (13) of the housing (1) thereby blocking a movement of the dampening piston (3) relative to the housing (1).

During assembly, the dampening piston is inserted in to the housing until the mounting ring is disposed under the notch of the housing. Then, a tool is inserted into the gap and the piston is released so that the force of the spring slides the mounting ring via the bevelled surface onto the latch surface whereby the mounting ring is expanded. In this position, a further movement of the dampening piston by the force of the spring is rendered impossible. To release the blocking, the dampening piston is pressed against the force of the spring and this may be achieved manually or through the chain. The mounting ring is then pushed off the latch surface and slides along the bevelled surface back into the groove. After again releasing the dampening piston without using the tool, the mounting ring remains ineffective so that the dampening piston is ready for operation. The described device is also advantageous because the blocking position, once released, can easily be reset by using the tool. The blocking position facilities the attachment of the chain because the chain tightener is only effective when the chain is mounted.

In a preferred embodiment of the invention, the dampening piston is in the blocking position before the beginning of its chain tightening range and this guarantees that after removal of the blocking, the dampening piston is positioned at the beginning of its chain tightening range. A further advantage of the described device resides in its simple structure since the blocking position requires the piston to be designed only with the groove provided with the latch surface and bevelled surface. The notch of the housing is an index notch which is provided anyway.

Figure 2:
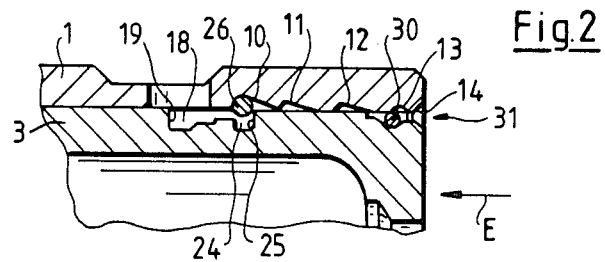
Figure 3:
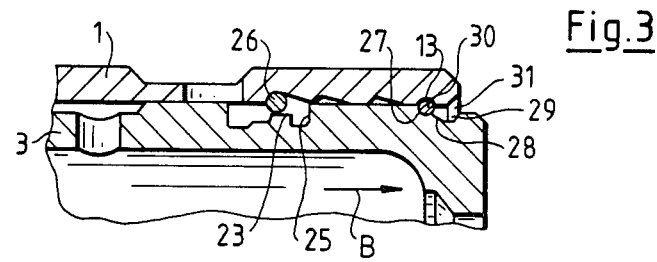
Figure 4:
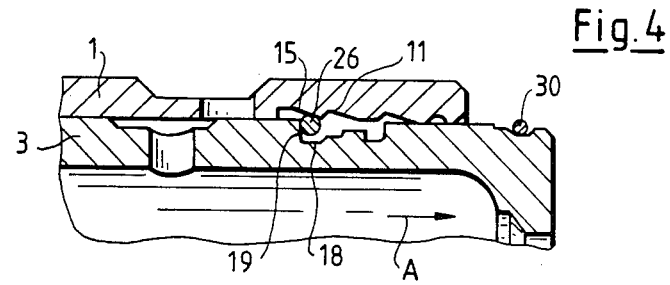
Figure 5:
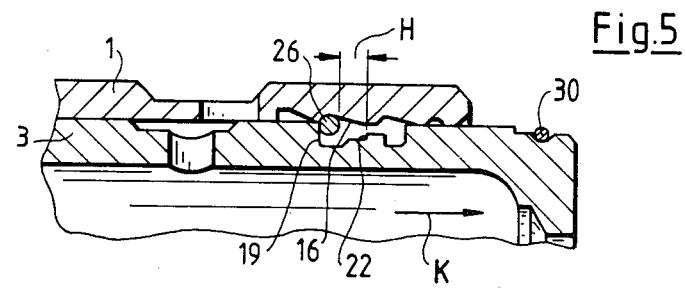
Figure 6:
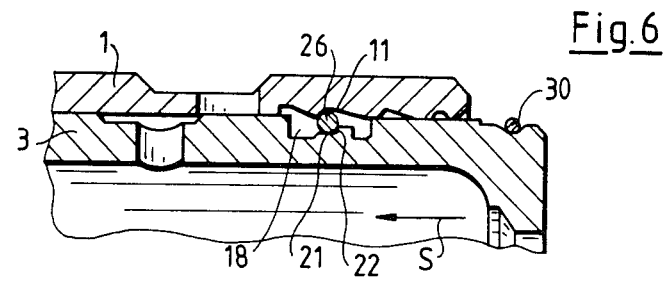

Referring now to the drawings:

FIG. 1 is a cross-sectional view of a chain tightener with the dampening piston in the outermost lock-in position, FIG. 2 is a partial view of the chain tightener with the dampening piston in the innermost stop position, FIG. 3 is a partial view of the chain tightener with the dampening piston blocked in mounting position, FIG. 4 is a partial view of the chain tightener with the dampening piston moving in the innermost lock-in position, FIG. 5 is a partial view of the chain tightener with the dampening piston in its innermost lock-in position and FIG. 6 is a partial view of the chain tightener with the chain exerting a shock load from its position of FIG. 5 onto the dampening piston. FIGS. 2 to 6 are a smaller scale in comparison to FIG. 1.

A one-piece housing (1) is provided with an unilaterially open guide bore (2) and inserted therein is a hollow dampening piston (3). At the side of the dampening piston (3) facing the bottom (4) of the housing (1) is a check valve (5). Arranged between the bottom (4) and the check valve (5) is a pressure spring (6) acting upon the piston (3). Provided laterally at the piston (3) is an opening (7) which is in communication with an oil pressure port (8) of the housing (1) and an opening (9) at the top of the piston (3) is provided for ventilation.

Arranged adjacent to each other from inside toward the outside at the inner circumference of the housing (1) are a receiving groove (10), three or, if necessary, more corresponding index notches (11,12,13) as well as a bevelled entrance (14). The diameter of the receiving groove (10) is greater than the one of the index notch (11) and the receiving groove (10) is provided with a bevelled surface (15) toward the index notch (11). The index notches (11,12) are provided with corresponding bevelled surfaces (16,17).

Arranged at the outer circumference of the piston (3) is a locking groove (18) which is defined on the one hand by a stop end face (19) and on the other hand by a stop ramp (20). The stop ramp (20) has a locking area (21), a stop edge (22) and a passing surface (23). Subsequent to the stop ramp (20) is a clamping groove (24) with an insert edge (25). The outer diameter of the stop end face (19) and the insert edge (25) correspond to the outer diameter of the piston (3) and the diameter of the passing surface (23) is smaller. A resilient stop ring (26) cooperates with the said circumferential grooves and notches of the housing (1) and the piston (3). At its outside, the piston (3) is provided with a groove (29) including a latch surface (27) and a bevelled surface (28) which cooperates with a mounting ring (30).

Assembling of the described chain tightener is attained in the following manner: After inserting the pressure spring (6) in the housing (1), the piston (3) is pushed in with the stop ring (26) located in its clamping groove (24). The mounting ring (30) is disposed in the groove (29) and resiliently bears against the groove base. During insertion of the piston (3), the stop ring (26) reaches the bevelled entrance (14) which presses the latter against its spring force into the clamping groove (24). Upon further pushing of the piston (3), the insert edge (25) presses the stop ring (26) below the index notches (13,12,11) until it is disposed in the receiving groove (10). In the receiving groove (10), the stop ring (26) expands under the action of its spring force so as to bear against the base of the receiving groove (10). The depth of the receiving groove (10) is smaller than the cross-section of the stop ring (26) so that the stop ring (26) disposed in the receiving groove (10) defines the innermost stop for the manual insertion in direction of the arrow (E) (see FIG. 2). The mounting ring (30) is then located below the index notch (13).

Thereafter, by inserting a tool through the gap (31) between the piston (3) and the housing (1), the mounting ring (30) is retained in this position and the piston (3) is released. Under the action of the pressure spring (6), the piston (3) is then shifted in the direction of arrow (B) while the latch surface (27) slides via the bevelled surface (28) and pushes the mounting ring (30) and pushes the latter against its spring force into the index notch (13). This represents the blocking position of the piston (3) (see FIG. 3) and in the blocking position, the chain tightener is mounted to the aggregate, for example an engine whose chain is to be tightened. In this blocking position, the stop ring (26) is ineffective and is arranged over the passing surface (23).

After the assembly of the chain and possibly of a transmission element provided between the piston (3) and the chain, the dampening piston (3) is acted upon manually in the direction of the arrow (B) so that the mounting ring (30) slides from the latch surface (27) under the action of its spring force via the bevelled surface (28) into the groove (29). This is not prevented by the stop ring (26) since its distance to the insert edge (25) is sufficiently large. The piston (3) now moves in the direction of the arrow (A) under the action of the pressure spring (6) in the chain tightening direction. The stop end face (19) thereby abut against the stop ring (26) and pushes the latter via the bevelled surface (15) in direction of the index notch (11) (see FIG. 4). The locking groove (18) is sufficiently deep so as to be prevented from obstructing the compression of the stop ring (26). The stop ring (26) then snaps in the first index notch (11). This position is the beginning of the chain tightening range and the chain is now tightened.

The mode of operation is as follows: Via the oil pressure port (8) which in the present example is under motor oil pressure, a high pressure is built up in the housing (1) between the latter and the piston (3) within the space (32) via the check valve (5). Upon a sudden load of the chain, a force is exerted onto the piston (3) in the direction of the arrow (S) (see FIG. 6). This results in a return movement of the piston (3) opposite to the direction of force of the pressure spring (6). The return movement is attenuated by the oil pressure within space (32) of the housing (1). During the return movement, the locking area (21) is moved under the stop ring (26) which is disposed in the index notch (11) and prevents the compression of the stop ring (26) while guaranteeing that the stop ring (26) remains at the base of the index groove (11). If the oil pressure within the space (32) is not sufficient to bring the piston (3) to a standstill upon a load, then the stop surface (22) abuts the stop ring (26). Consequently, the return movement of the piston (3) is limited in the direction of the arrow (S). This maximal return stroke (H) is determined by the distance of the stop end face (19) from the stop surface (22) and the diameter of the circular cross-section of the stop ring (26). The maximal return stroke amounts to 2 mm or example.

The limitation of the return stroke (H) prevents the chain from skipping teeth of its driven gears during sudden loads. In this context, it is also favorable that the stop ring (26) merely acts with regard to tightening and dampening of the chain as stop and its spring characteristics serves only to urge it into the respectively suitable position. The limitation of the maximal return stroke (H) by the stop ring (26) is, for example, effective when shortly after starting the motor, insufficient oil pressure has been built up yet within space (32), or when at shut down of the engine, the return strand which is acted upon by the chain tightener is loaded.

In case the chain lengthens during operation e.g. due to wear, then the piston (3) is further shifted by the action of the pressure spring (6) and the oil pressure within the space (32), respectively, in the direction of the arrow (K) (see FIG. 5) whereby its stop end face (19) displaces the stop ring (26) via the bevelled surface (16) of the index notch (11) into the next index notch (12). The distance of the index notches (11,12,13) is greater than the maximal return stroke (H).

When the stop ring (26) reaches the index notch (12), then the above-stated defines the maximal return stroke (H). Finally, the stop ring (26) reaches the index notch (13) (see FIG. 1). Even in this outermost lock-in position, the piston (3) can return only by the maximal return stroke (H) and the effective stroke (N) of the piston (3) determining the chain adjusting range amounts to 23 mm, for example.

Various modifications of the chain tightener of the invention may be made without departing from the spirit or scope thereof and it is to be understood that the invention is intended to be limited only as defined in the appended claims.

What we claim is:

1. A chain tightener with a dampening piston guided in a housing and axially acted upon by a spring in the chain tightening direction wherein the dampening piston is retainable by a mounting ring within the housing in a blocking position which is released through axial pressure in the direction opposite to the chain tightening direction, wherein the mounting ring (30) snaps into a groove (29) which is located at a forward end of the dampening piston (3) and is provided with a bevelled surface (28) and an adjacent latch surface (27), and that the mounting ring (30) is shiftable onto the latch surface (27) via the bevelled surface (28) with a tool insertable in a gap (31) between the housing (1) and the dampening piston (3) wherein the mounting ring (30) engages in a notch (13) of the housing (1) thereby blocking a movement of the dampening piston (3) relative to the housing (1).

2. A chain tightener of claim 1 wherein the spring (6) shifts the bevelled surface (28) under the mounting ring (30) which is held by the tool until the mounting ring (30) bears against the latch surface (27) wherein the mounting ring (30) is expanded.

3. A chain tightener of claim 1 wherein the mounting ring (30) is radially resilient.

4. A chain tightener of claim 3 wherein the spring (6) shifts the bevelled surface (28) under the mounting ring (30) which is held by the tool until the mounting ring (30) bears against the latch surface (27) wherein the mounting ring (30) is expanded.

5. A chain tightener of claim 1 wherein the dampening piston (3) is positioned in the blocking position before the beginning of its chain tightening range.

* * * * *